United States Patent
Lin (10) Patent No.: US 8,400,534 B2
(45) Date of Patent: Mar. 19, 2013

(54) NOISE REDUCTION METHODS AND SYSTEMS FOR IMAGING DEVICES

(75) Inventor: Peng Lin, Pleasanton, CA (US)

(73) Assignee: Aptina Imaging Corporation, George Town (KY)

( * ) Notice: Subject to any disclaimer, the term of this patent is extended or adjusted under 35 U.S.C. 154(b) by 1032 days.

(21) Appl. No.: 12/366,865

(22) Filed: Feb. 6, 2009

(65) Prior Publication Data

US 2010/0201850 A1   Aug. 12, 2010

(51) Int. Cl.
*H04N 9/64* (2006.01)
(52) U.S. Cl. .......................................... 348/242
(58) Field of Classification Search ................... 348/242
See application file for complete search history.

(56) References Cited

U.S. PATENT DOCUMENTS

| 6,600,833 | B1 | 7/2003 | Tan et al. |
| 6,937,775 | B2 | 8/2005 | Gindele et al. |
| 2005/0270388 | A1 | 12/2005 | Hamamoto |
| 2006/0050159 | A1 | 3/2006 | Ahn |
| 2006/0262206 | A1* | 11/2006 | Lee et al. ..................... 348/241 |
| 2007/0109430 | A1 | 5/2007 | Staelin et al. |
| 2007/0201064 | A1 | 8/2007 | Heo |
| 2007/0247530 | A1 | 10/2007 | Takahasi et al. |

* cited by examiner

*Primary Examiner* — Scott J Sugarman
*Assistant Examiner* — Vipin Patel (57) ABSTRACT

Embodiments describe noise reduction methods and systems for imaging devices having a pixel array having a plurality of pixels, each pixel representing one of a plurality of captured colors and having an associated captured pixel value. Noise reduction methods filter a captured pixel value for a respective pixel based on the captured pixel values associated with pixels in a window of pixels surrounding the respective pixel. Disclosed embodiments provide a low cost noise reduction filtering process that takes advantage of the correlations among the red, green and blue color channels to efficiently remove noise while retaining image sharpness. A noise model can be used to derive a parameter of the noise reduction methods.

24 Claims, 10 Drawing Sheets

NOISE REDUCTION METHODS AND SYSTEMS FOR IMAGING DEVICES

FIELD OF THE INVENTION

The disclosed embodiments relate generally to digital imaging and, more particularly, to noise reduction methods and systems for imaging devices.

BACKGROUND

Imagers typically consist of an array of pixel cells containing photosensors. Each pixel cell produces a signal corresponding to the intensity of light impinging on its photosensor when an image is focused on the array by one or more lenses. These signals may be stored in a memory and displayed on a monitor, manipulated by software, printed, or otherwise used to provide information about the optical image. The magnitude of the signal produced by each pixel is substantially proportional to the amount of light impinging on its photosensor.

Several kinds of imagers are generally known. Complementary metal-oxide-semiconductor ("CMOS") imagers and charge coupled device ("CCD") imagers are among the most common. CMOS imagers are discussed, for example, in U.S. Pat. No. 6,140,630, U.S. Pat. No. 6,204,524, U.S. Pat. No. 6,310,366, U.S. Pat. No. 6,326,652, and U.S. Pat. No. 6,376,868, which are all commonly assigned to Micron Technology, Inc.

To allow an imager to capture a color image, the pixel cells must be able to separately detect color values of light, for example, red (R) light, green (G) light, and blue (B) light. A color filter array is typically placed in front of the array of pixel cells so each pixel cell measures light of the color of its respective filter. The most common type of color filter array, often referred to as a "Bayer filter," is described in U.S. Pat. No. 3,971,065. Bayer filters consist of alternating red and green filters in a first row and alternating blue and green filters in a second row. This pattern is repeated throughout the array. Thus, in an imager employing a Bayer filter, one-half of the pixels are sensitive to green light, one-quarter are sensitive to red light, and the remaining one-quarter are sensitive to blue light.

To provide a color image, however, red, green, and blue values are required for every pixel location. Thus, the two "missing" color values at each pixel location must be estimated. For example, a pixel underlying a red portion of a Bayer filter directly measures red light but does not measure blue and green light. Therefore, blue and green values must be estimated for this red pixel location. Similarly, red and green values must be estimated for blue pixel locations, and red and blue values must be estimated for green pixel locations. This estimation process is often referred to as "demosaicing."

New imager designs often contain more pixel cells than previous generation imagers in order to provide increased image resolution. To maintain small imager size, however, the size of each pixel cell is often reduced from one generation to the next. This reduces the photosensitive area associated with each pixel cell, making the image sensor more susceptible to noise, especially under low light conditions. Noise can be reduced by applying mathematical transforms, often called "filters," to pixel values.

Prior art noise reduction techniques separately filter red, green, and blue pixel values. This can result in blurring or inefficient noise reduction. Therefore, an improved method of reducing noise in Bayer-domain images is desirable.

DETAILED DESCRIPTION OF THE DISCLOSED EMBODIMENTS

In the following detailed description, reference is made to the accompanying drawings, which form a part hereof and show by way of illustration specific embodiments of the invention. These embodiments are described in sufficient detail to enable those skilled in the art to practice them, and it is to be understood that the disclosed embodiments may be modified and that other embodiments may be utilized. Moreover, the progression of steps described herein is merely an example. The sequence of steps is not limited to that set forth herein and may be changed or reordered, with the exception of steps necessarily occurring in a certain order.

Embodiments describe noise reduction methods and systems for imaging devices having a pixel array having a plurality of pixels, each pixel representing one of a plurality of captured colors and having an associated captured pixel value. Noise reduction methods filter a captured pixel value for a respective pixel based on the captured pixel values associated with pixels in a window of pixels surrounding the respective pixel. Disclosed embodiments provide a low cost noise reduction filtering process that takes advantage of the correlations among the red, green and blue color channels to efficiently remove noise while retaining image sharpness. A noise model can be used to derive a parameter of the noise reduction methods. The following example embodiments describe methods, devices, and systems for reducing noise in a Bayer-domain image having a plurality of red, blue, and green pixels representing the red, blue, and green colors of a Bayer filter, respectively.

Figure 1:
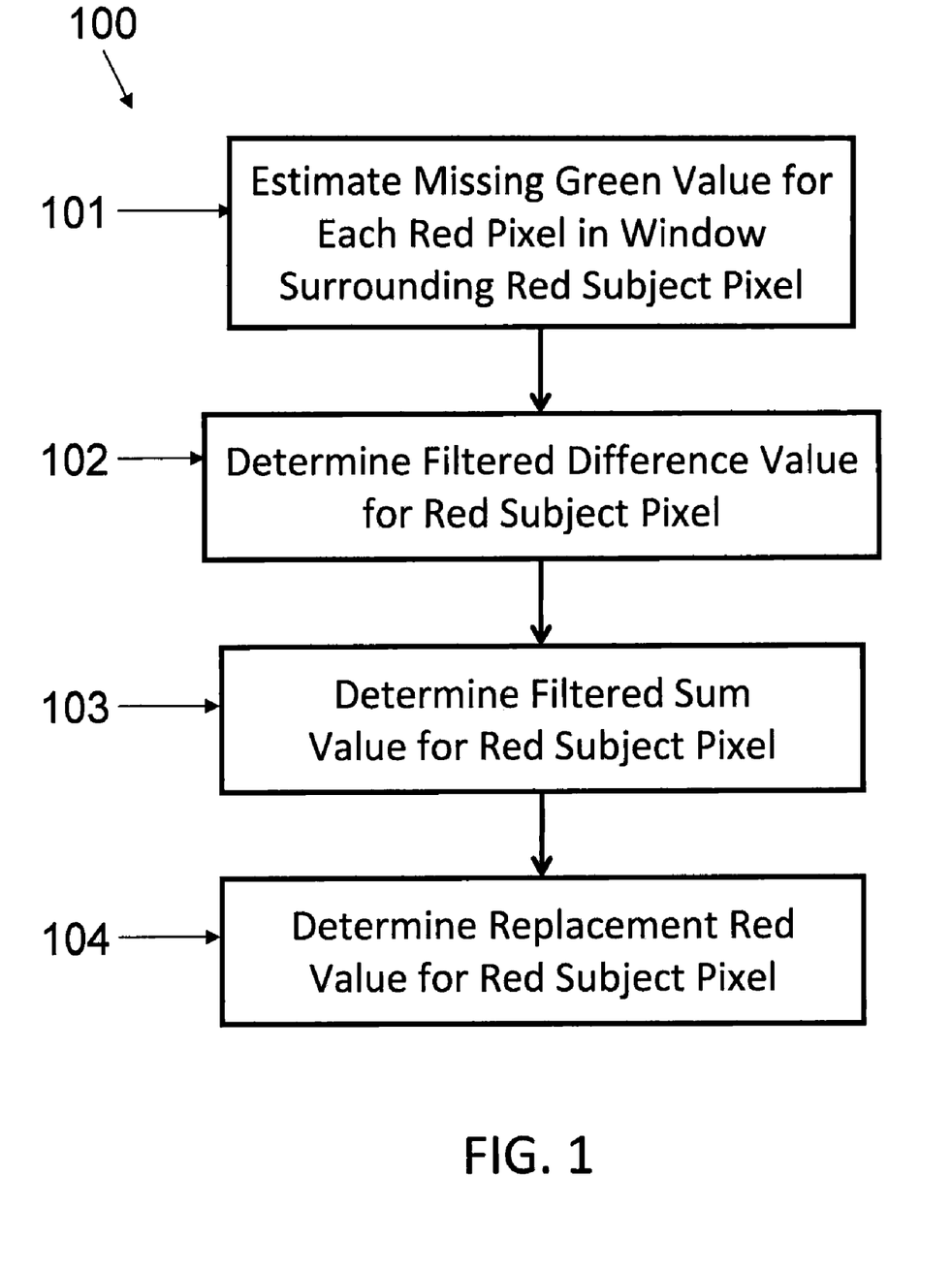
FIG. 1 is a flow chart illustrating a method of filtering a red pixel value in accordance with a disclosed embodiment.
Figure 2:
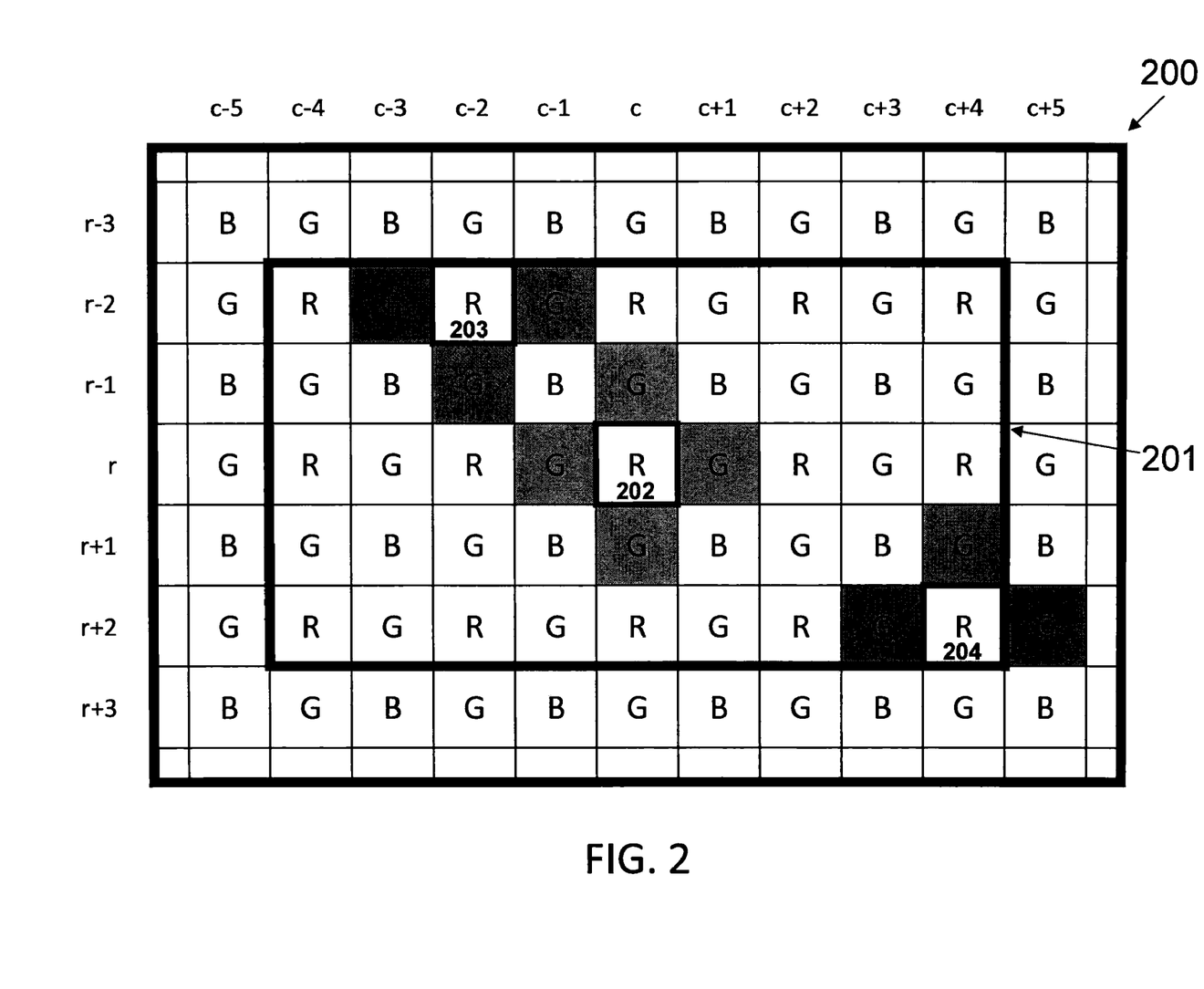
FIG. 2 illustrates a portion of a Bayer-patterned pixel array surrounding a red pixel according to a first disclosed embodiment.

The filtering process 100 (FIG. 1) for red pixel noise reduction in a first embodiment is now described in greater detail. To process a red subject pixel, a 5×9 surrounding window in the Bayer domain centered about the red subject pixel is used. Window sizes other than 5×9 may be used to process a red subject pixel. FIG. 2 illustrates the surrounding window 201 for the red subject pixel 202 in the pixel array 200. As shown in FIG. 2, the 5×9 window 201 contains fifteen red pixels including the red subject pixel 202. Each red pixel within window 201 has an associated sensed red value denoted by R(i,j) and an associated estimated green value denoted by G(i,j), where row i={−2, 0, 2} and column j={−4, −2, 0, 2, 4}. Accordingly, the sensed red value and the estimated green value associated with the red subject pixel 202 is denoted by R(0,0) and G(0,0).

The filtering process 100 for the red subject pixel 202 at step 101 comprises estimating a missing green value for each of the fifteen red pixels in the surrounding window 201. FIG. 2 illustrates one method of estimating the missing green value for a respective red pixel that involves averaging the sensed green values associated with the neighboring green pixels of the respective red pixel. Sensed green values associated with the shaded green pixels in FIG. 2 immediately surrounding the red subject pixel 202 located in the middle row of window 201 are used to estimate the missing green value for the red subject pixel 202. Likewise, the sensed green values associated with the shaded green pixels immediately adjacent to the red pixel 203 located on the top row of window 201 and to the red pixel 204 located in a corner of window 201 are respectively used to estimate the missing green values for red pixels 203 and 204.

According to FIG. 2, for example, the green value for the red subject pixel 202 located in the middle row of window 201 can be estimated as follows:

$$G(i, j) = \frac{G(i, j-1) + G(i, j+1) + G(i-1, j) + G(i+1, j)}{4} \quad (1)$$

that is, the green value G at location (i,j) is the average of the green pixel values immediately to the left, right, above and below the red pixel at location (i,j).

Alternatively, if the red pixel is located on the top row of window 201 (e.g., red pixel 203), then the missing green value can be estimated as follows:

$$G(i, j) = \frac{G(i, j-1) + G(i, j+1) + 2 \cdot G(i+1, j)}{4} \quad (2)$$

that is, the green value G at location (i,j) at the top of a window is the average of the green pixel values immediately to the left, right, and below the red pixel at location (i,j), and where the green pixel immediately below is weighted twice as heavily as the green pixels immediately to the left and right.

If the red pixel is located on the corner of window 201 (e.g., red pixel 204), then the missing green value can be estimated as follows:

$$G(i, j) = \frac{G(i, j-1) + G(i, j+1) + 2 \cdot G(i-1, j)}{4} \quad (3)$$

that is, the green value G at location (i,j) at a corner of the window is the average of the green pixel values immediately to the left, right, and above the red pixel at location (i,j), and where the green pixel immediately above is weighted twice as heavily as the green pixels immediately to the left and right. Even though the green pixel immediately to the right of red pixel 204 is located outside of window 201, this green pixel is available during the demosaic process because the pixel circuits of an entire row in an imaging sensor are operated on at the same time.

Figure 3:
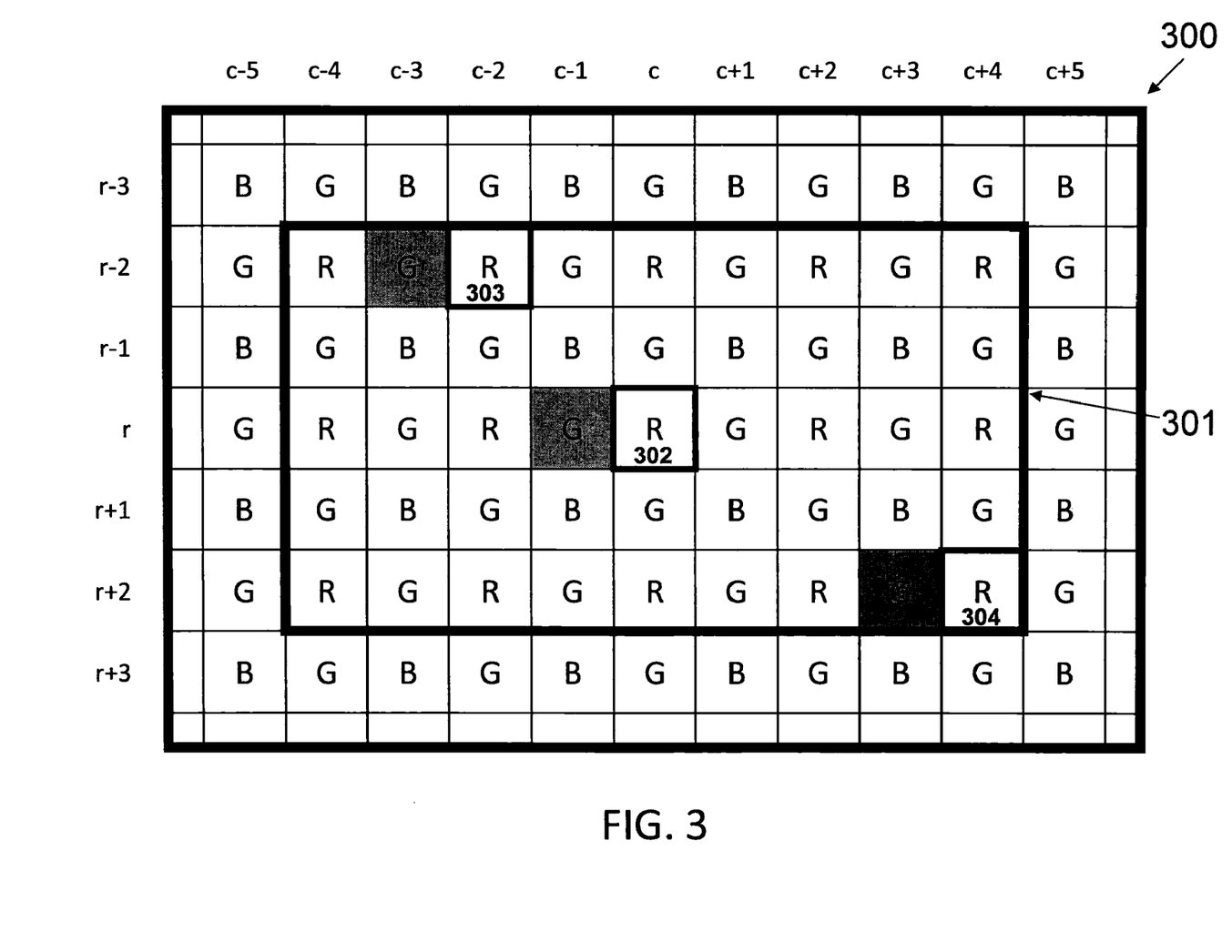
FIG. 3 illustrates a portion of a Bayer-patterned pixel array surrounding a red pixel according to a second disclosed embodiment.

In another embodiment, the missing green value for a red pixel is estimated by copying the sensed green value associated with the green pixel immediately to the left of the red pixel. As shown in FIG. 3, the missing green values for the red subject pixel 302 and red pixels 303 and 304 are estimated as follows:

$$G(i,j) = G(i,j-1) \quad (4)$$

that is, the green value G at location (i,j) is equal to the sensed green value associated with the green pixel immediately to the left of the red pixel at location (i,j). The demosaicing algorithm illustrated in FIG. 3 has the advantage of being more cost-effective and simpler to implement while maintaining good performance.

In yet another embodiment, the missing green value for a red pixel is estimated by copying the sensed green value associated with the green pixel immediately to the right of the red pixel. Other methods of estimating a green value G for a red pixel at location (i,j) can also be used.

Once the green value for each red pixel in the window surrounding a red subject pixel is estimated at step 101, a filtered difference value for the red subject pixel at location (r,c) is determined at step 102, as follows:

$$\tilde{D}_R(r, c) = \frac{\sum_{(i,j) \in R} a(i, j) \cdot D_R(i, j)}{\sum_{(i,j) \in R} a(i, j)} \quad (5)$$

where R is the set of red pixels in the window, $D_R(i,j)$ denotes the difference value associated with a red pixel at location (i,j), and a(i,j) denotes a filter coefficient associated with location (i,j).

The difference value associated with the red pixel at location (i,j) is determined as follows:

$$D_R(i,j) = R(i,j) - G(i,j) \quad (6)$$

that is, the difference value is the difference between the sensed red pixel value and the estimated green value for the red pixel at location (i,j).

The filter coefficients a(i,j) for Equation (5) are defined as follows:

$$a(i, j) = \begin{cases} 1, & |D_R(i, j) - D_R(r, c)| \le q \cdot \sigma_r \\ 0, & \text{otherwise} \end{cases} \quad (7)$$

where $\sigma_r$ is a red channel noise level and p is a scaling coefficient. The red channel is the analog color digital processing channel for a red pixel and the red channel noise level $\sigma_r$ can be derived using the noise model disclosed with reference to Equation (23). The scaling coefficient p is set to 3 in this example embodiment and may be set to other values depending on the desired sensitivity of the red pixel noise reduction filter.

Determination of a filtered sum value for the red subject pixel at location (r,c) at step 103 is similar to that of the filtered difference value:

$$\tilde{S}_R(r, c) = \frac{\sum_{(i,j)\in R} b(i, j) \cdot S_R(i, j)}{\sum_{(i,j)\in R} b(i, j)} \qquad (8)$$

where R is the set of red pixels in the window, $S_R(i,j)$ denotes the sum value associated with a red pixel at location (i,j), and b(i,j) denotes a filter coefficient associated with location (i,j).

The sum value associated with the red pixel at location (i,j) is determined as follows:

$$S_R(i,j)=R(i,j)+G(i,j) \qquad (9)$$

that is, the sum value is the sum of the sensed red pixel value and the estimated green value for the red pixel at location (i,j).

The filter coefficients b(i,j) for Equation (8) are defined as follows:

$$b(i, j) = \begin{cases} 1, & |S_R(i, j) - S_R(r, c)| \le q \cdot \sigma_r \\ 0, & \text{otherwise} \end{cases} \qquad (10)$$

where $\sigma_r$ is the same red channel noise level used in Equation (7) and q is a scaling coefficient, which is set to 3 in this example embodiment.

After determining the filtered difference value and the filtered sum value at steps 102 and 103, respectively, a replacement red value for the red subject pixel at location (r,c) can be obtained at step 104 as follows:

$$\tilde{R}(r, c) = \frac{\tilde{D}_R(r, c) + \tilde{S}_R(r, c)}{2} \qquad (11)$$

where $\tilde{D}_R(r,c)$ denotes the filtered difference value determined using Equation (5), and $\tilde{S}_R(r,c)$ denotes the filtered sum value determined using Equation (8). Once determined, the replacement red value $\tilde{R}(r,c)$ replaces the sensed red value associated with the red subject pixel at location (r,c).

Figure 5:
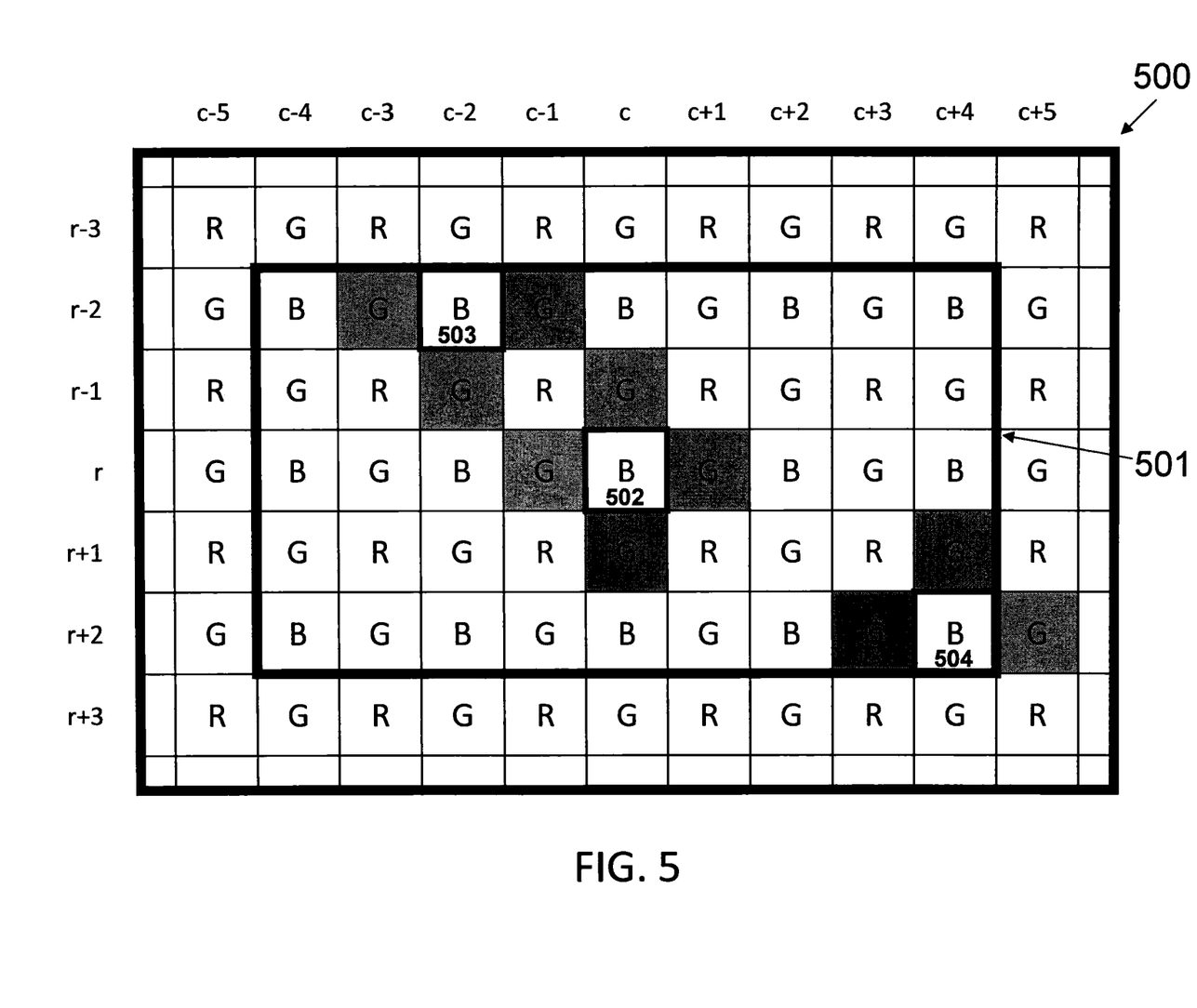
FIG. 5 illustrates a portion of a Bayer-patterned pixel array surrounding a blue pixel according to a first disclosed embodiment.

The filtering process for blue pixel noise reduction is similar to that for the red pixel. To process a blue subject pixel, a 5×9 surrounding window in the Bayer domain centered about the blue subject pixel is used. FIG. 5 illustrates the surrounding window 501 for the blue subject pixel 502 in the pixel array 500. As shown in FIG. 5, the 5×9 surrounding window 501 contains fifteen blue pixels including the blue subject pixel 502. Each blue pixel at location (i,j) within the window 501 has an associated sensed blue value denoted by B(i,j) and an associated estimated green value denoted by G(i,j), where i={−2, 0, 2} and j={−4, −2, 0, 2, 4}. Accordingly, the blue value and the estimated green value associated with the blue subject pixel 502 is denoted by B(0,0) and G(0,0).

Figure 4:
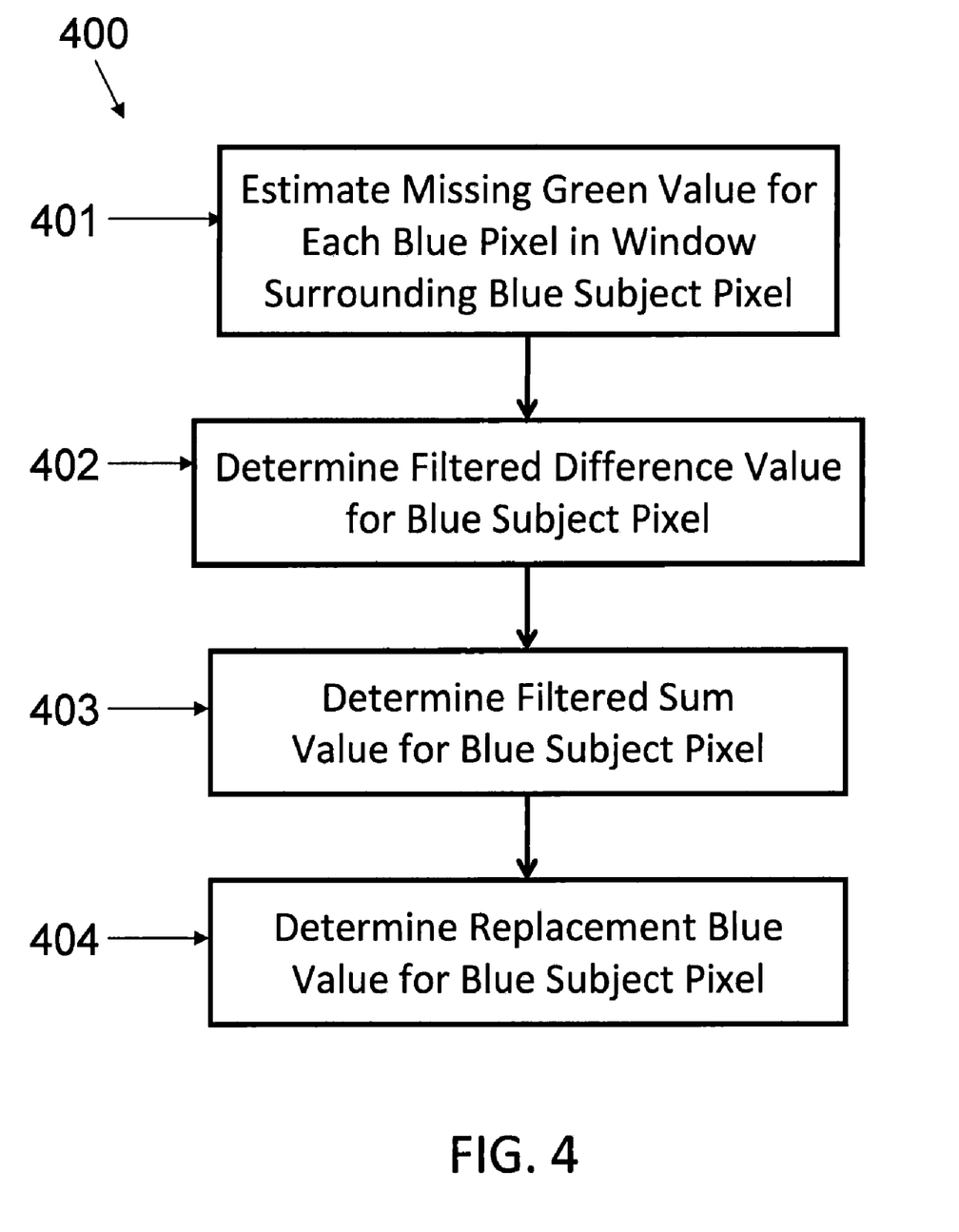
FIG. 4 is a flow chart illustrating a method of filtering a blue pixel value in accordance with a disclosed embodiment.

Turning to FIG. 4, the filtering process 400 for the blue subject pixel 502 comprises estimating a missing green value for each blue pixel in window 501 at step 401. Demosaicing algorithms described above for estimating the green value for a red pixel can also be used to estimate the green value for a blue pixel. As shown in FIG. 5, the missing green value for blue subject pixel 502 can be estimated by averaging the four neighboring green pixels immediately to the left, right, above, and below blue subject pixel 502.

Figure 6:
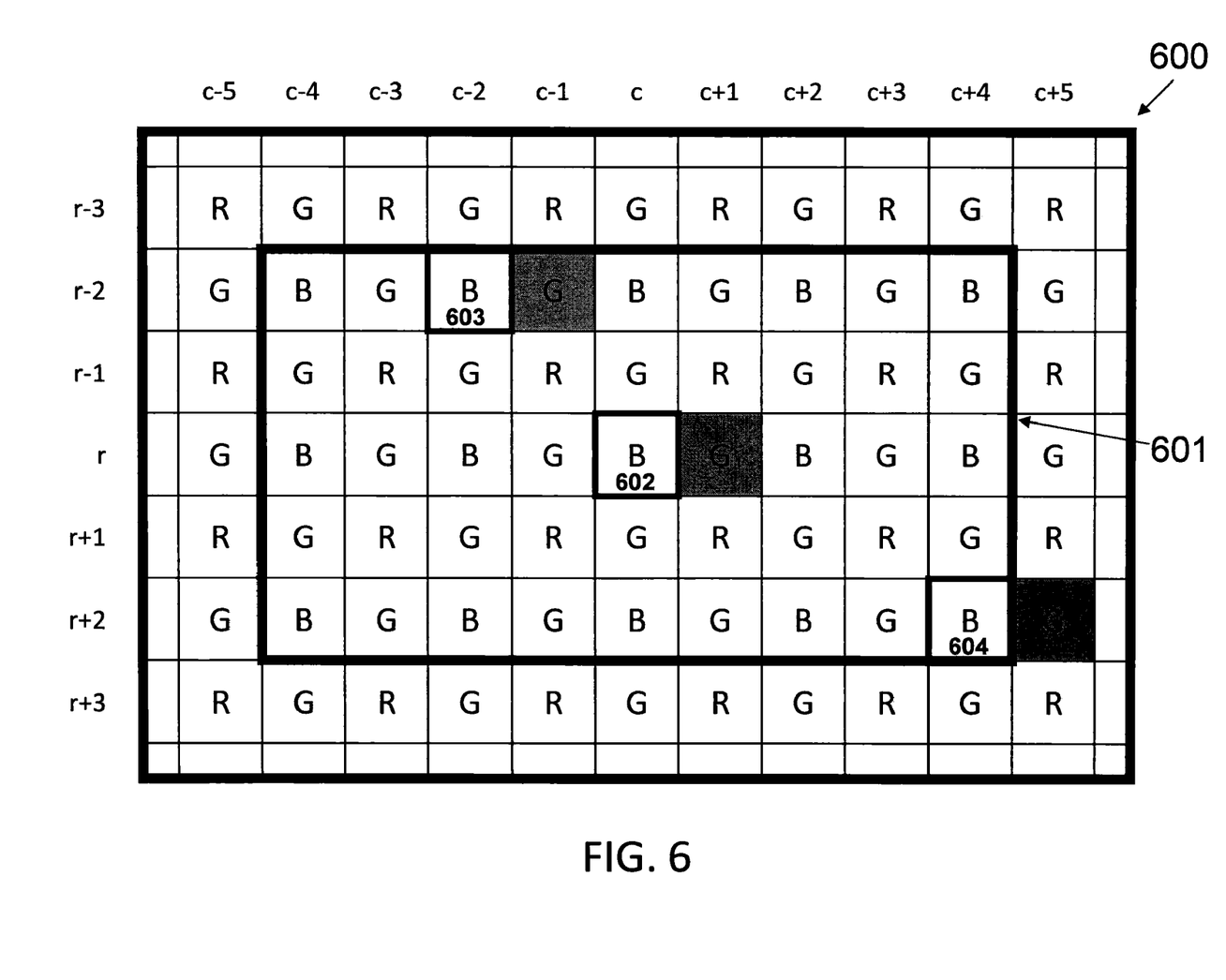
FIG. 6 illustrates a portion of a Bayer-patterned pixel array surrounding a blue pixel according to a second disclosed embodiment.

In another embodiment, the missing green value for a blue pixel is estimated by copying the sensed green value associated with the green pixel immediately to the right of the blue pixel. As shown in FIG. 6, the missing green values for the blue subject pixel 602 and blue pixels 603 and 604 are estimated as follows:

$$G(i,j)=G(i,i+1) \qquad (12)$$

that is, the green value G at location (i,j) is equal to the sensed green value associated with the green pixel immediately to the right of the blue pixel at location (i,j). Other methods of estimating a green value for a blue pixel at location (i,j) can also be used.

Once a green value is estimated for each blue pixel in the window surrounding a blue subject pixel, a filtered difference value for the blue subject pixel at location (r,c) is determined at step 402, as follows:

$$\tilde{D}_B(r, c) = \frac{\sum_{(i,j)\in B} a(i, j) \cdot D_B(i, j)}{\sum_{(i,j)\in B} a(i, j)} \qquad (13)$$

where B is the set of blue pixels in the window, $D_B(i,j)$ denotes the difference value associated with a blue pixel at location (i,j), and a(i,j) denotes a filter coefficient associated with location (i,j).

The difference value associated with the blue pixel at location (i,j) is determined as follows:

$$D_B(i,j)=B(i,j)-G(i,j) \qquad (14)$$

that is, the difference value is the difference between the sensed blue pixel value and the estimated green value for the blue pixel at location (i,j).

The filter coefficients a(i,j) for Equation (13) are defined as follows:

$$a(i, j) = \begin{cases} 1, & |D_B(i, j) - D_B(r, c)| \le q \cdot \sigma_b \\ 0, & \text{otherwise} \end{cases} \qquad (15)$$

where $\sigma_b$ is a blue channel noise level and p is a scaling coefficient. The blue channel is the analog color digital processing channel for a blue pixel and the blue channel noise level $\sigma_b$ can be derived using the noise model disclosed with reference to Equation (23). The scaling coefficient p is set to 3 in this example embodiment and may be set to other values depending on the desired sensitivity of the blue pixel noise reduction filter.

Determination of a filtered sum value for the blue subject pixel at location (r,c) at step 403 is similar to that of the filtered difference value:

$$\tilde{S}_B(r, c) = \frac{\sum_{(i,j)\in B} b(i, j) \cdot S_B(i, j)}{\sum_{(i,j)\in B} b(i, j)} \qquad (16)$$

where B is the set of blue pixels in the window, $S_B(i,j)$ denotes the sum value associated with a blue pixel at location (i,j), and b(i,j) denotes a filter coefficient associated with location (i,j).

The sum value associated with the blue pixel at location (i,j) is determined as follows:

$$S_B(i,j)=B(i,j)+G(i,j) \qquad (17)$$

that is, the sum value is the sum of the sensed blue pixel value and the estimated green value for the blue pixel at location (i,j).

The filter coefficients b(i,j) for Equation (16) are defined as follows:

$$b(i, j) = \begin{cases} 1, & |S_B(i, j) - S_B(r, c)| \le q \cdot \sigma_b \\ 0, & \text{otherwise} \end{cases} \quad (18)$$

where $\sigma_b$ is the same blue channel noise level as that used in Equation (15) and q is a scaling coefficient, which is set to 3 in this example embodiment.

After determining the filtered difference and sum values, a replacement blue value for the blue subject pixel at location (r,c) is obtained at step 404 as follows:

$$\tilde{B}(r, c) = \frac{\tilde{D}_B(r, c) + \tilde{S}_B(r, c)}{2} \quad (19)$$

where $\tilde{D}_B(r,c)$ denotes the filtered difference value calculated using Equation (13), and $\tilde{S}_B(r,c)$ denotes the filtered sum value calculated using Equation (16). Once determined, the replacement blue value replaces the sensed blue value for the blue pixel at location (r,c).

Figure 7:
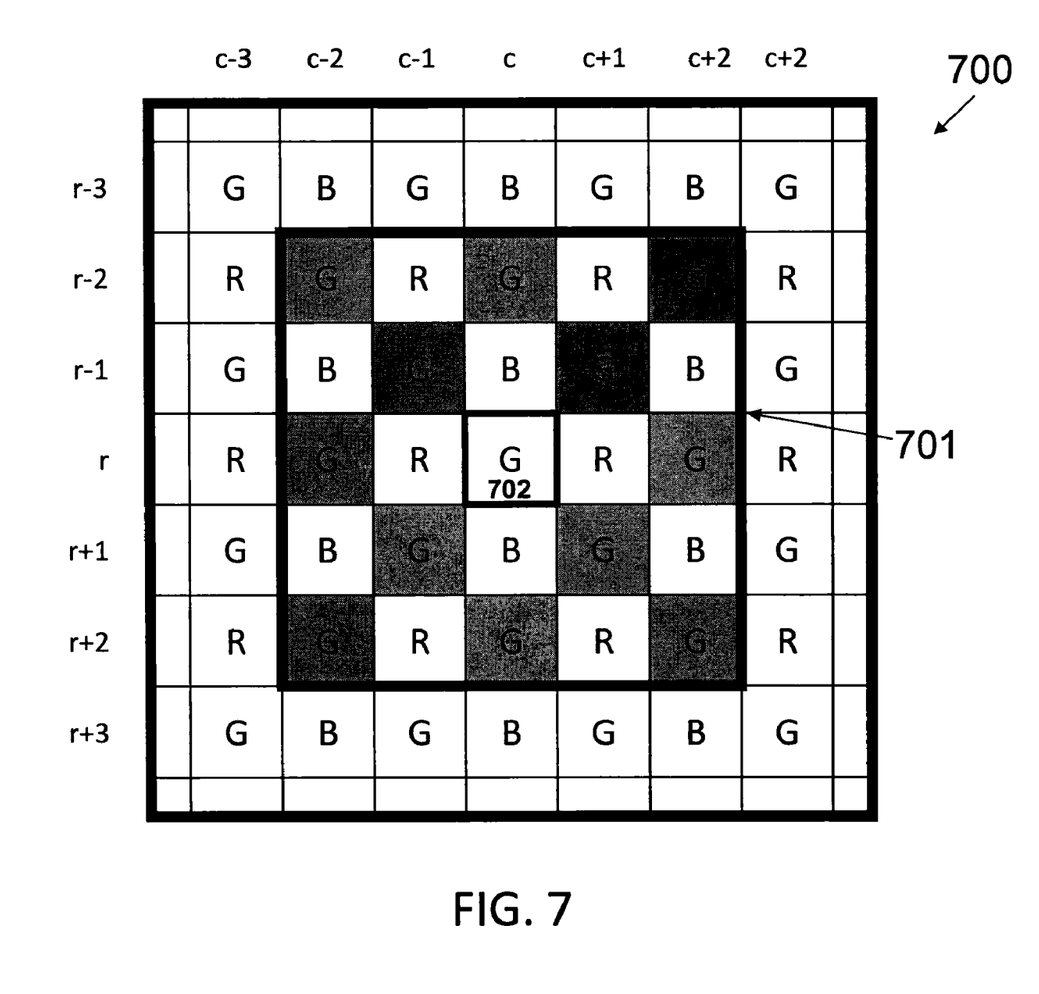
FIG. 7 illustrates a portion of a Bayer-patterned pixel array surrounding a green pixel.

The filtering process for green pixel noise reduction is different from the filtering processes for red and blue pixels. To process a green subject pixel, green pixels within a 5×5 surrounding window in the Bayer domain centered about the green subject pixel are used. FIG. 7 illustrates the surrounding window 701 for the green subject pixel 702 in the pixel array 700. Shaded green pixels in FIG. 7 indicate the green pixels other than the green subject pixel 702 used to filter the sensed green value associated with the green subject pixel 702. Difference and sum values need not be determined since only green pixels within window 701 are used in this filtering process. The filtering process for green pixel noise reduction comprises determining a replacement green value $\tilde{G}(r,c)$ for the green subject pixel 702 at location (r,c), as follows:

$$\tilde{G}(r, c) = \frac{\sum_{(i,j) \in G} w(i, j) \cdot G(i, j)}{\sum_{(i,j) \in G} w(i, j)} \quad (20)$$

where G is the set of green pixels in the window including the green subject pixel at location (r,c), G(i,j) denotes the sensed green value at row i={-2, 0, 2} and column j={-2, 0, 2}, and w(i,j) denotes a filter coefficient associated with location (i,j) defined as follows:

$$w(i, j) = \begin{cases} 3, & |G(i, j) - G(r, c)| \le c_1 \cdot \sigma_g \\ 2, & c_1 \cdot \sigma_g < |G(i, j) - G(r, c)| \le c_2 \cdot \sigma_g \\ 1, & c_2 \cdot \sigma_g < |G(i, j) - G(r, c)| \le c_3 \cdot \sigma_g \\ 0, & \text{otherwise} \end{cases} \quad (21)$$

where $\sigma_g$ is a green channel noise level and $c_1$, $c_2$ and $c_3$ are scaling coefficients. The green channel is the analog color digital processing channel for a green pixel and the green channel noise level $\sigma_g$ can be derived using the noise model disclosed below with reference to Equation (23). Scaling coefficients $c_1$, $c_2$ and $c_3$ are set to equal 1, 2 and 3, respectively, in this example embodiment and each coefficient may be set to other values depending on the desired sensitivity of the green pixel noise reduction filter.

Noise level parameters $\sigma_r$, $\sigma_b$, and $\sigma_g$ determine the filter strength for the red, blue and green noise reduction filtering processes described above. Noise level parameters can be provided as system parameters that depend on sensor characteristics, analog gains, and/or exposure time. Although the following embodiment for determining a noise level parameter is described with reference to use with a CMOS imaging sensor, this is merely one example sensor that may be used. The embodiment described herein may also be used with other sensors, including those supporting CCD, and other sensors having a different readout architecture.

Because the quantity of charge collected in any given pixel in a CMOS imaging sensor follows the Poisson distribution model, the standard deviation of the charge collected is determined as follows:

$$\sigma = K \cdot \sqrt{I} \quad (22)$$

where K is a noise model coefficient and the noise level σ for the analog color digital processing channel for the pixel is proportional to I, the square root of the number of incident photons striking the pixel.

Figure 8:
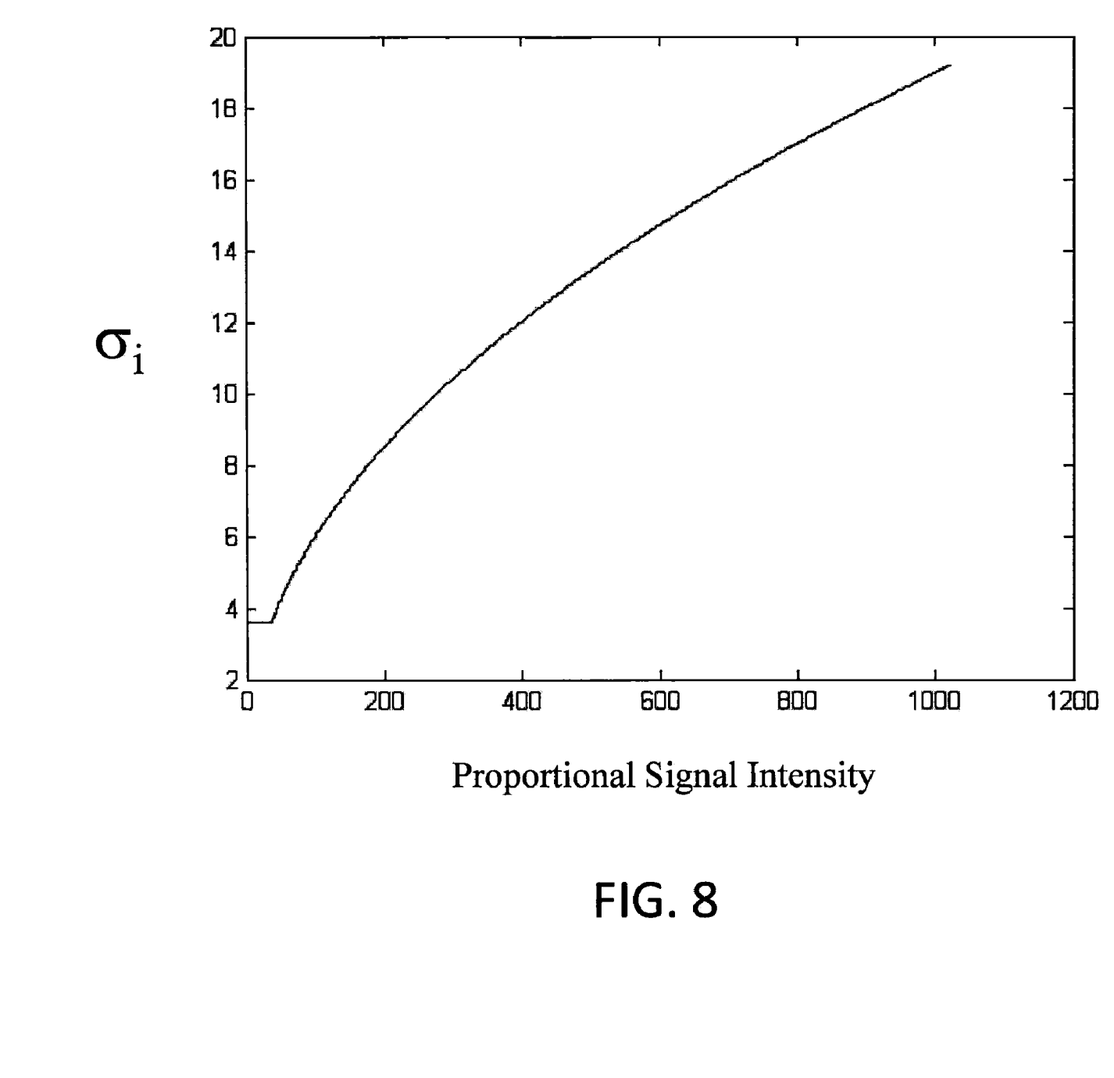
FIG. 8 is a graph illustrating a noise model curve in accordance with a disclosed embodiment.

Accordingly, noise level parameters for the noise reduction filtering processes described above can be determined using the following noise model:

$$\sigma_i = \max(\sigma_0, K \cdot \sqrt{A_i \cdot I_i}) \quad (23)$$

where i={red channel, blue channel, green channel}, $\sigma_0$ is a noise floor, K is a noise model coefficient, $\sigma_i$ is a noise level, $I_i$ is an image pixel intensity, and $A_i$ is an analog gain associated with the analog color digital processing color channel i. FIG. 8 shows a noise model curve represented by the noise model in Equation (23). The analog gain $A_i$ can be obtained from a camera automatic exposure setting during image capture. The noise floor $\sigma_0$ and noise model coefficient K are determined based on the imaging sensor characterization data for each imaging device using the following formulas:

$$K = \sqrt{\frac{\text{conv\_gain} \cdot (2^{ADC\_bit\_depth} - 1)}{\text{sat\_signal}}} \quad (24)$$

$$\sigma_0 = \frac{\text{read\_noise} \cdot \text{conv\_gain} \cdot (2^{SDC\_bit\_depth} - 1)}{\text{sat\_signal}} \quad (25)$$

where read_noise is a read noise expressed in e⁻, conv_gain is a conversion gain expressed in V/e⁻, sat_signal is a saturation signal expressed in V, and ADC_bit_depth is an analog-to-digital bit depth.

Figure 9:
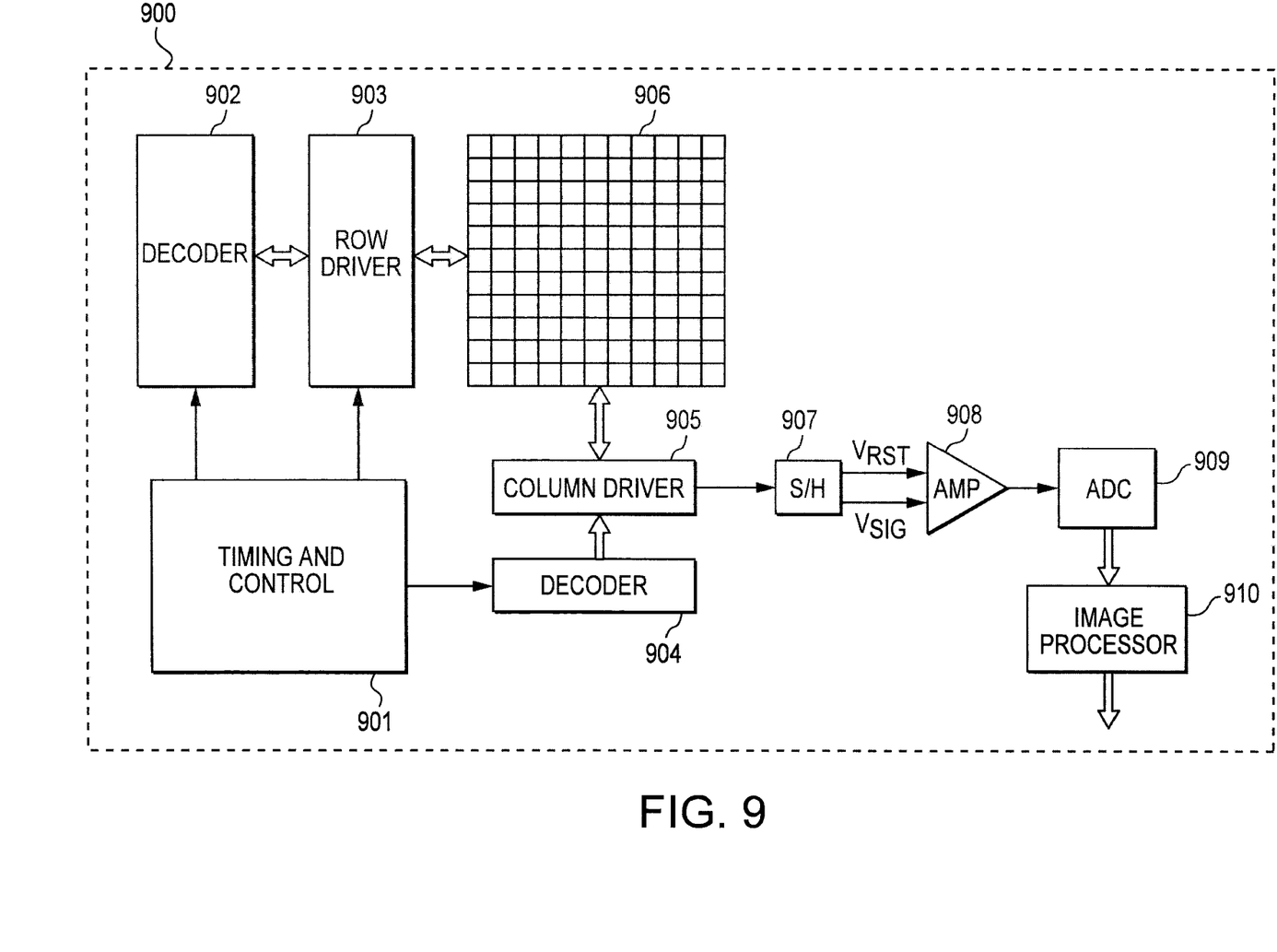
FIG. 9 is a partial block diagram of an imaging device constructed in accordance with a disclosed embodiment.

FIG. 9 illustrates a partial block diagram of an example system-on-a-chip imaging device 900 constructed in accordance with an embodiment disclosed herein. The imaging device 900 includes an imaging sensor 906. Connected to, or as part of, the imaging sensor 906 are row and column decoders 902, 904 and row and column driver circuitry 903, 905 that are controlled by a timing and control circuit 901. The imaging sensor 906 comprises a plurality of pixel circuits arranged in a predetermined number of columns and rows. In operation, the pixel circuits of each row in imaging sensor 906 are all operated on at the same time by a row select line and the pixel circuits of each column are selectively output onto column output lines by a column select line. A plurality of row and column lines are provided for the entire imaging sensor 906. The row lines are selectively activated by row driver circuitry 903 in response to the row address decoder 902 and the column select lines are selectively activated by a column driver 905 in response to the column address decoder 904. Thus, a row and column address is provided for each pixel circuit. The timing and control circuit 901 controls the address decoders 902, 904 for selecting the appropriate row and column lines for pixel readout, and the row and column driver circuitry 903, 905, which apply driving voltage to the drive transistors of the selected row and column lines.

For the CMOS architecture, however, each column contains sampling and hold circuitry 907 that read a pixel reset signal Vrst and a pixel image signal Vsig for selected pixel circuits. The sampling and hold circuitry 907 contains sampling capacitors that have the capacity to store the Vrst and Vsig signals. A differential signal (Vrst−Vsig) is produced by differential amplifier 908 for each pixel. Each of the differential signals are then digitized by the analog-to-digital converter 909. The analog-to-digital converter 909 supplies digitized color pixel signals to an image processor 910, which forms a digital image output. The image processor 910 is responsible for image and color processing, which includes performing pixel processing operations, such as, for example, noise reduction filtering in accordance with the disclosed embodiments. Noise reduction filtering methods can be implemented by the image processor 910, for instance, before, during, or after the demosaic process. In one example embodiment, the demosaic process provides estimated green values for red pixels in a window surrounding a red subject pixel.

Although the imaging device 900 has been described with reference to use with a CMOS imaging sensor, this is merely one example sensor that may be used. Embodiments described herein may also be used with other sensors, including those supporting CCD, and other sensors having a different readout architecture. Additionally, raw imaging data can be output, stored and filtered elsewhere, for example, in a system as described in relation to FIG. 10 or in a stand-alone image processing system.

Figure 10:
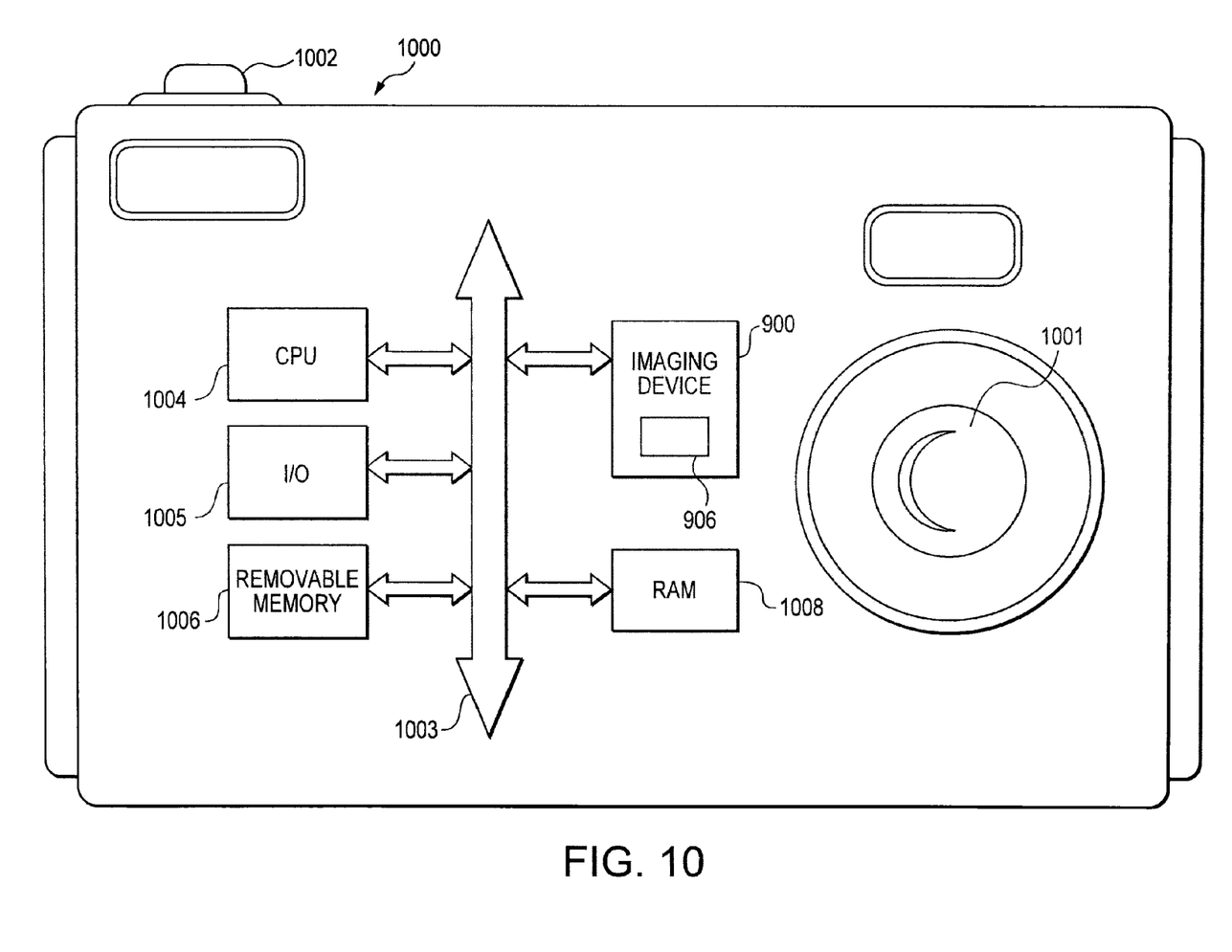
FIG. 10 illustrates a system constructed in accordance with a disclosed embodiment.

FIG. 10 shows a typical system 1000, such as, for example, a camera that could include imaging device 900. Without being limiting, such a system could include a computer system, camera system, scanner, machine vision, vehicle navigation system, video telephone, surveillance system, automatic focus system, star tracker system, motion detection system, image stabilization system, and other systems employing an imaging device 900.

As shown in FIG. 10, system 1000 includes a lens 1001 for focusing an image on the imaging device 900 when a shutter release button 1002 is pressed. System 1000 generally comprises a central processing unit (CPU) 1004, such as a microprocessor that controls camera functions and image flow, and communicates with an input/output (I/O) device 1005 over a bus 1003. The imaging device 900 also communicates with the CPU 1004 over the bus 1003. The system 1000 also includes random access memory (RAM) 1008, and can include removable memory 1006, such as flash memory, which also communicates with the CPU 1004 over the bus 1003. The imaging device 900 may be combined with the CPU 1004, with or without memory storage on a single integrated circuit, such as, for example, a system-on-a-chip, or on a different chip than the CPU 1004. As described above, raw image data from the imaging device 900 can be output and stored, for example in the random access memory 1008 or the CPU 1004. In accordance with a disclosed embodiment that uses a 5×9 surrounding window in the Bayer domain centered about a red or blue subject pixel, only five rows of pixel data need to be stored at a time. As a new row of pixel data is selected for output in imaging sensor 906, the new row of pixel data replaces the oldest row of stored pixel data. Noise reduction filtering in accordance with disclosed embodiments can be performed on the raw image data or on the stored data using processor 910 of the imaging device 900. In other embodiments, noise reduction filtering can be performed on the raw data or the stored data by the CPU 1004, or can be sent outside the camera and operated on by a stand-alone processor, e.g., a computer, external to system 1000.

Disclosed embodiments provide a low cost noise reduction filtering process that takes advantage of the correlations among the red, green and blue color channels to efficiently remove noise while retaining image sharpness. The disclosed embodiments can be implemented in hardware or software at low cost. That is, the methods described above can be implemented in an image processing circuit, which can be implemented as, for example, hardware logic, a programmed processor, a combination of the two, or with other signal processing circuits. The methods described above can be implemented in computer instructions and stored in a computer readable medium to perform the steps outlined above.

While embodiments have been described in detail in connection with the examples known at the time, it should be readily understood that they are not limited to such disclosed embodiments. Rather, they can be modified to incorporate any number of variations, alterations, substitutions, or equivalent arrangements not heretofore described. For instance, the noise reduction filtering methods may be used with color filters other than the Bayer filter, window sizes other than a rectangle (e.g., 5×9) and square (e.g., 5×5) may be used to determine a filtered color value for a subject pixel, and the scaling coefficient for a filter coefficient may be set to values other than 1, 2, or 3 depending on the desired sensitivity of the noise reduction filter. Accordingly, the claimed invention is not to be seen as limited by the foregoing description, but is only limited by the scope of the attached claims.

What is claimed as new and desired to be protected by Letters Patent of the United States is:

1. A method of processing a digital image with an image processor, wherein the digital image comprises a plurality of pixels, the method comprising:

with the image processor, defining a first window of pixels surrounding a first subject pixel representing a first color, the first window comprising a plurality of first pixels representing the first color;

with the image processor, calculating a replacement pixel value of the first color by computing a weighted average of the pixel values of the first color associated with the first subject pixel and the first pixels in the first window;

with the image processor, replacing the pixel value of the first color associated with the first subject pixel with the replacement pixel value of the first color;

with the image processor, defining a second window of pixels surrounding a second subject pixel representing a second color different from the first color, the second window comprising a plurality of second pixels representing the second color;

with the image processor, estimating a respective interpolated pixel value of the first color for the second subject pixel and each of the second pixels in the second window;

with the image processor, calculating a replacement pixel value of the second color for the second subject pixel by computing a weighted average of a plurality of difference and sum values, each difference value and sum value calculated for a respective pixel of the second subject pixel and the plurality of second pixels based on the estimated interpolated pixel value of the first color and the pixel value of the second color associated with the respective pixel; and with the image processor, replacing the pixel value of the second color associated with the second subject pixel with the replacement pixel value of the second color.

2. The method of claim 1, wherein calculating the replacement pixel value of the first color by computing a weighted average of the pixel values of the first color associated with the first subject pixel and the first pixels in the first window comprises weighting the pixel value associated with a respective first pixel more heavily if the difference between the pixel value associated with the respective first pixel and the pixel value associated with the first subject pixel is less than or equal to a threshold.

3. The method of claim 1, wherein estimating the interpolated pixel value of the first color for the second subject pixel and each of the second pixels in the second window comprises averaging the pixel values of the first color associated with the pixels immediately adjacent to each of the respective second subject pixel and the second pixels.

4. The method of claim 1, wherein estimating the interpolated pixel value of the first color for the second subject pixel and each of the second pixels in the second window comprises using the pixel value of the first color associated with a pixel adjacent to each of the respective second subject pixel and the second pixels.

5. The method of claim 1, wherein computing the weighted average of a plurality of difference and sum values comprises weighting each difference value associated with a respective pixel of the second subject pixel and the second pixels more heavily if the difference between the difference value associated with the respective pixel and the difference value associated with the second subject pixel is less than or equal to a threshold.

6. A method of reducing noise in a Bayer-domain image comprising a plurality of pixels using an image processor, the method comprising:

with the image processor, defining a first window of pixels surrounding a green subject pixel having a corresponding green pixel value, the first window comprising a plurality of green pixels;

with the image processor, identifying a first group of pixels consisting of the green subject pixel and the plurality of green pixels in the first window, calculating a replacement green pixel value for the green subject pixel by computing a weighted average of the green pixel values associated with the green pixels in the first group;

with the image processor, replacing the green pixel value associated with the green subject pixel with the replacement green pixel value;

with the image processor, defining a second window of pixels surrounding a non-green subject pixel, the second window comprising a plurality of green and non-green pixels arranged in rows and columns;

with the image processor, identifying a second group of pixels consisting of the non-green subject pixel and the non-green pixels in the second window, wherein the non-green pixels in the second window represent the same color as the non-green subject pixel, wherein the non-green subject pixel and the non-green pixels in the second window each have respective non-green pixel values;

with the image processor, estimating a respective green pixel value for each respective non-green pixel in the second group using the green pixel value associated with at least one green pixel adjacent to each respective non-green pixel in the second group;

with the image processor, calculating a replacement non-green pixel value for the non-green subject pixel, the replacement non-green pixel value being computed as a weighted average of a plurality of difference and sum values, each difference value and sum value computed for a respective non-green pixel in the second group using the estimated green pixel value and the non-green pixel value associated with the respective non-green pixel in the second group; and with the image processor, replacing the non-green pixel value associated with the non-green subject pixel with the replacement non-green pixel value.

7. The method of claim 6, wherein calculating the replacement green pixel value for the green subject pixel in the first window comprises, for a green subject pixel at a location (r,c) in the first window, calculating the replacement green pixel value as follows:

$$\tilde{G}(r, c) = \frac{\sum_{(i,j) \in N} w(i, j) \cdot G(i, j)}{\sum_{(i,j) \in N} w(i, j)}$$

wherein N consists of the green pixels in the first group, w is a filter coefficient, and G(i,j) is the green pixel value of a green pixel in the first group at a location (i,j).

8. The method of claim 7, wherein the filter coefficient is determined as follows:

$$w(i, j) = \begin{cases} 3, & |G(i, j) - G(r, c)| \le c_1 \cdot \sigma \\ 2, & c_1 \cdot \sigma < |G(i, j) - G(r, c)| \le c_2 \cdot \sigma \\ 1, & c_2 \cdot \sigma < |G(i, j) - G(r, c)| \le c_3 \cdot \sigma \\ 0, & \text{otherwise} \end{cases}$$

wherein G(r,c) is the green pixel value of the green subject pixel, σ is a noise level of an analog color digital processing channel for the green subject pixel, and $c_1$, $c_2$ and $c_3$ are predetermined parameters.

9. The method of claim 8, wherein the noise level is determined as follows:

$$\sigma = \max(\sigma_0, K \sqrt{A \cdot I})$$

wherein $\sigma_0$ is a minimum noise level associated with an imager, K is a noise model coefficient, A is an analog gain associated with the analog color digital processing channel, and I is a signal level for the analog color digital processing channel.

10. The method of claim 9, wherein the minimum noise level is determined as follows:

$$\sigma_0 = \frac{\text{read\_noise} \cdot \text{conv\_gain} \cdot (2^{SDC\_bit\_depth} - 1)}{\text{sat\_signal}}$$

wherein read_noise is a read noise associated with the imager, conv_gain is a conversion gain associated with the imager, sat_signal is a saturation signal associated with the imager, and ADC_bit_depth is a bit depth associated with an analog-to-digital converter of the imager.

11. The method of claim 9, wherein the noise model coefficient is determined as follows:

$$K = \sqrt{\frac{\text{conv\_gain} \cdot (2^{ADC\_bit\_depth} - 1)}{\text{sat\_signal}}}$$

wherein conv_gain is a conversion gain associated with the imager, sat_signal is a saturation signal associated with the imager, and ADC_bit_depth is a bit depth associated with an analog-to-digital converter of the imager.

12. The method of claim 6, wherein estimating the green pixel value for a respective non-green pixel in the second group comprises, for a respective non-green pixel in a top row of the second window, averaging the green pixel values associated with the green pixels immediately to the left, right, and below the respective non-green pixel.

13. The method of claim 12, wherein averaging the green pixel values associated with the green pixels immediately to the left, right, and below the respective non-green pixel further comprises weighting the green pixel value associated with the green pixel immediately below the respective non-green pixel twice as heavily as the green pixel values associated with the green pixels immediately to the left and right of the respective pixel.

14. The method of claim 6, wherein estimating the green pixel value for a respective non-green pixel in the second group comprises, for a respective non-green pixel located in a middle row of the second window, averaging the green pixel values associated with the green pixels immediately to the left, right, above, and below the respective non-green pixel.

15. The method of claim 6, wherein estimating the green pixel value for a respective non-green pixel at a location (i,j) comprises estimating the non-green pixel value as follows:

$$G(i,j) = G(i,j-1)$$

wherein G(i,j−1) is the green pixel value of the green pixel immediately to the left of the respective non-green pixel.

16. The method of claim 6, wherein estimating the green pixel value for a respective non-green pixel at a location (i,j) comprises estimating the non-green pixel value as follows:

$$G(i,j) = G(i,j+1)$$

wherein G(i,j+1) is the green pixel value of the green pixel immediately to the right of the respective non-green pixel.

17. The method of claim 6, wherein computing the difference value for a non-green subject pixel comprises, for a non-green subject pixel at a location (r,c), computing the difference value as follows:

$$\tilde{D}(r, c) = \frac{\sum_{(i,j) \in N} a(i, j) \cdot D(i, j)}{\sum_{(i,j) \in N} a(i, j)}$$

wherein N consists of the non-green pixels in the second group, a is a filter coefficient, and D(i,j) is the difference value of a non-green pixel in the second group at a location (i,j).

18. The method of claim 17, wherein the filter coefficient is determined as follows:

$$a(i, j) = \begin{cases} 1, & |D(i, j) - D(r, c)| \leq p \cdot \sigma \\ 0, & \text{otherwise} \end{cases}$$

wherein D(r,c) is the difference value of the non-green subject pixel, p is a predetermined parameter, and σ is a noise level of an analog color digital processing channel for the non-green subject pixel.

19. the method of claim 6 wherein computing the sum value for a non-green subject pixel comprises, for a non-green subject pixel at a location (r,c) computing the sum value as follows:

$$\tilde{S}(r, c) = \frac{\sum_{(i,j) \in N} b(i, j) \cdot S(i, j)}{\sum_{(i,j) \in N} b(i, j)}$$

Wherein N consists of the non-green pixels in the second group, b is a filter coefficient, an S(I,j) is the sum value of a non-green pixel in the second group at a location (I,j).

20. The method of claim 19, wherein the filter coefficient is determined as follows:

$$b(i, j) = \begin{cases} 1, & |S(i, j) - S(r, c)| \leq p \cdot \sigma \\ 0, & \text{otherwise} \end{cases}$$

wherein S(r,c) is the sum value of the non-green subject pixel, p is a predetermined parameter, and σ is a noise level of an analog color digital processing channel for the non-green subject pixel.

21. An imager comprising:
 a pixel array comprising a plurality of pixels, wherein the array is configured to capture a pixel value associated with each pixel;
 a memory configured to store captured pixel values; and
 an image processor coupled to the memory and configured to:
  define a first window of pixels surrounding a first subject pixel representing a first color, the first window comprising a plurality of first pixels representing the first color;
  determine a first adjusted pixel value of the first color for the first subject pixel, the first adjusted pixel value being computed as a weighted average of the captured pixel values of the first color associated with the first subject pixel and the first pixels in the first window;
  replace the captured pixel value of the first color associated with the first subject pixel with the first adjusted pixel value of the first color;
  define a second window of pixels surrounding a second subject pixel representing a second color different from the first color, the second window comprising a plurality of second pixels representing the second color;
  estimate an interpolated pixel value of the first color for the second subject pixel and for each second pixel in the second window;
  determine a second adjusted pixel value of the second color for the second subject pixel, the second adjusted pixel value being calculated as a weighted average of a plurality of difference and sum values, each difference value and sum valued computed for a respective pixel of the second subject pixel and the second pixels in the second window based on the interpolated pixel value of the first color and the captured pixel value of the second color associated with the respective pixel; and replace the captured pixel value of the second color associated with the second subject pixel with the second adjusted pixel value of the second color.

22. The imager of claim 21, wherein the imager comprise part of a system for reducing noise in an image, the system further comprising:

an input device configured to receive the image comprising a plurality of pixel values; and a memory configured to store pixel values received via the input device.

23. A method of calibrating a noise reduction filtering process for a color channel of a pixel array of an imager having an image processor and an analog-to-digital converter, the method comprising:

with the image processor, computing a minimum noise level associated with the imager as follows:

$$\sigma_0 = \frac{\text{read\_noise} \cdot \text{conv\_gain} \cdot (2^{SDC\_bit\_depth} - 1)}{\text{sat\_signal}}$$

wherein read noise is a read noise associated with the imager, conv gain is a conversion gain, sat signal is a saturation signal, and ADC bit depth is a bit depth associated with the analog-to-digital converter;

with the image processor, computing a noise model coefficient K based on the conversion gain associated with the imager, the saturation signal associated with the imager, and the bit depth associated with the analog-to-digital converter of the imager as follows:

$$K = \sqrt{\frac{\text{conv\_gain} \cdot (2^{ADC\_bit\_depth} - 1)}{\text{sat\_signal}}} \ ;$$

and with the image processor, setting a filter strength of the noise reduction filtering process based on the minimum noise level and the noise model coefficient.

24. The method of claim 23, wherein setting the filter strength of the noise reduction filtering process comprises setting a filter strength that is calculated as follows:

$$\sigma = \max(\sigma_0, K\sqrt{A \cdot I})$$

wherein A is an analog gain associated with the color channel and I is a signal level for the color channel.

* * * * *